United States Patent [19]

Tracy

[11] 4,307,712
[45] Dec. 29, 1981

[54] ROTATABLE, HERMETICALLY SEALED, TUBULAR, SOLAR HEAT COLLECTING SYSTEM

[76] Inventor: Richard B. Tracy, 8545 Pulaski Hwy., Baltimore, Md. 21237

[21] Appl. No.: 175,634

[22] Filed: Aug. 6, 1980

[51] Int. Cl.³ .............................................. F24J 3/02
[52] U.S. Cl. .................................. 126/443; 126/424; 126/438; 126/446
[58] Field of Search ............... 126/424, 425, 433, 443, 126/446, 450, 448

[56] References Cited

U.S. PATENT DOCUMENTS

| | | | |
|---|---|---|---|
| 4,129,119 | 12/1978 | Yoke | 126/424 |
| 4,150,662 | 4/1979 | Summers | 126/443 |
| 4,151,828 | 5/1979 | Mather et al. | 126/443 |
| 4,153,042 | 5/1979 | Tragert | 126/443 |

FOREIGN PATENT DOCUMENTS 2006421 5/1979 United Kingdom ................ 126/446

*Primary Examiner*—James C. Yeung
*Attorney, Agent, or Firm*—John F. McClellan, Sr.

[57] ABSTRACT

A system comprising one or more straight, rotatable, hermetically sealed, tubular solar heat collecting units employs for each unit an outer tube and concentric with it an inner tube, the two tubes double-housing an axial multi-flanged or finned tubular conductor of fluid to be heated; to heat fluid a reflective sheet is disposed to take the curve of the reflective trough and concentrate radiant energy from the sun onto the conduit when stray reflections may be caught by the flanges, relieving requirement for good optical figure in the reflective sheet; end caps seal the unit except for the protrusive ends of the conductor; the conductor can act as axis of rotation for each unit; in array a plurality of the units can be interconnected and driven in unison to follow the sun.

1 Claim, 5 Drawing Figures

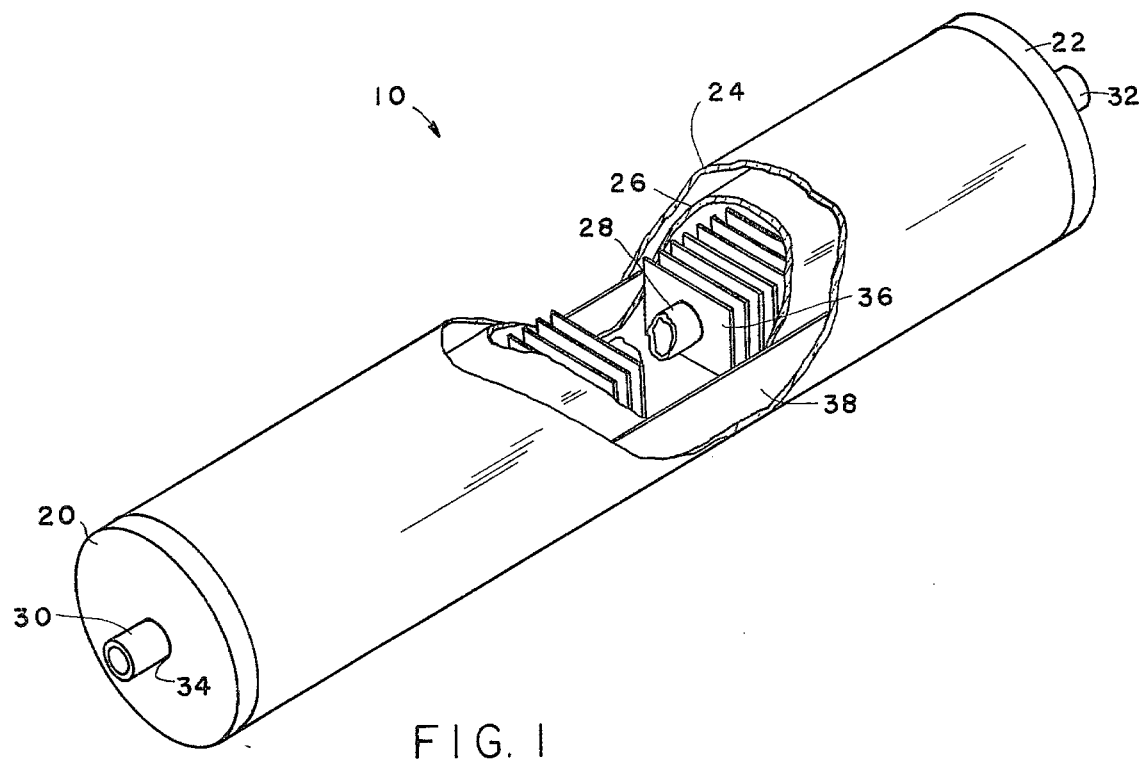
FIG. 1
FIG. 2
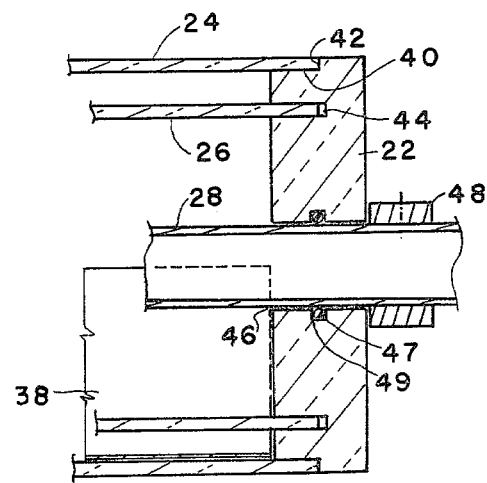

ROTATABLE, HERMETICALLY SEALED, TUBULAR, SOLAR HEAT COLLECTING SYSTEM

This invention relates generally to solar energy and particularly to solar energy collector systems.

BACKGROUND OF THE INVENTION

A principal object of the invention is to provide a simplified system for collecting solar energy in the most economical manner compatible with efficiency, durability, compactness, and lightness of weight minimizing roof stresses on installation.

Today as never before in the history of the civilized world energy must be conserved for the present and future generations or else living according to the standards we have known may disappear and all people suffer real hardships over the spans of their lives. It has been estimated that the entire supply of oil conventionally available in the world will have been exhausted in twenty to thirty years.

Home and office and factory space and water heating consume far more energy than will be allotted for these purposes in the future, and it is questionable whether the predictable deficiency in supply can be made up in increased burner nozzle efficiency or in vastly better insulation. What is needed is a clean primary source of domestic and commercial heat which is economical, lightweight and compact.

In the prior art various disclosures have been made to further use of solar energy including those in the following U.S. Patents:

No. 3,490,396 granted to H. C. Kelly, Jr. on Jan. 20, 1979, shows a concept of coaxial members with reflector in a solar energy system;

No. 4,051,834 granted to J. C. Fletcher, NASA, on Oct. 4, 1977, shows the use of an inner conduit, and outer cylindrical transparent covering with reflector conforming to it.

No. 4,150,662 granted to V. R. Summers on Apr. 24, 1979, shows a solar collector with dual concentric walls and separate reflector;

No. 4,094,299 granted to P. Voelker on June 13, 1978, shows the concept of a plurality of transparent concentric cylinders around a central collector area, and a reflecting surface;

No. 4,186,724 granted to D. H. Nelson, Feb. 5, 1980, shows another form of solar collector with dual concentric walls and separate reflector.

Further objects are to provide a system as described which is easily adapted to various sizes, which is double insulated against conductive and convective heat losses, which is easy to assemble and requires minimum labor to make and to assemble, which can be assembled in the field, which is flexible in application, and which is easy to rotate to follow the path of the sun.

BRIEF SUMMARY OF THE INVENTION

In brief summary given as cursive description only and not as limitation the invention includes a collector system based on coaxial outer and inner transparent insulative walls with ends, housing coaxially a conductive fluid conduit having thereon a plurality of radially finned elements which may economically be of the type employed in more conventional heating equipment; a coacting array of such units which is orientable is also disclosed.

The above and other objects and advantages of the invention will become more readily understood on examination of the following description, including the drawings, in which like characters refer to like parts.

BRIEF DESCRIPTION OF THE DRAWINGS

FIG. 1 is a perspective view partially broken away to show interior detail;

FIG. 2 is a longitudinal sectional detail of an end of the unit shown in FIG. 1;

DETAILED DESCRIPTION

Figure 3:
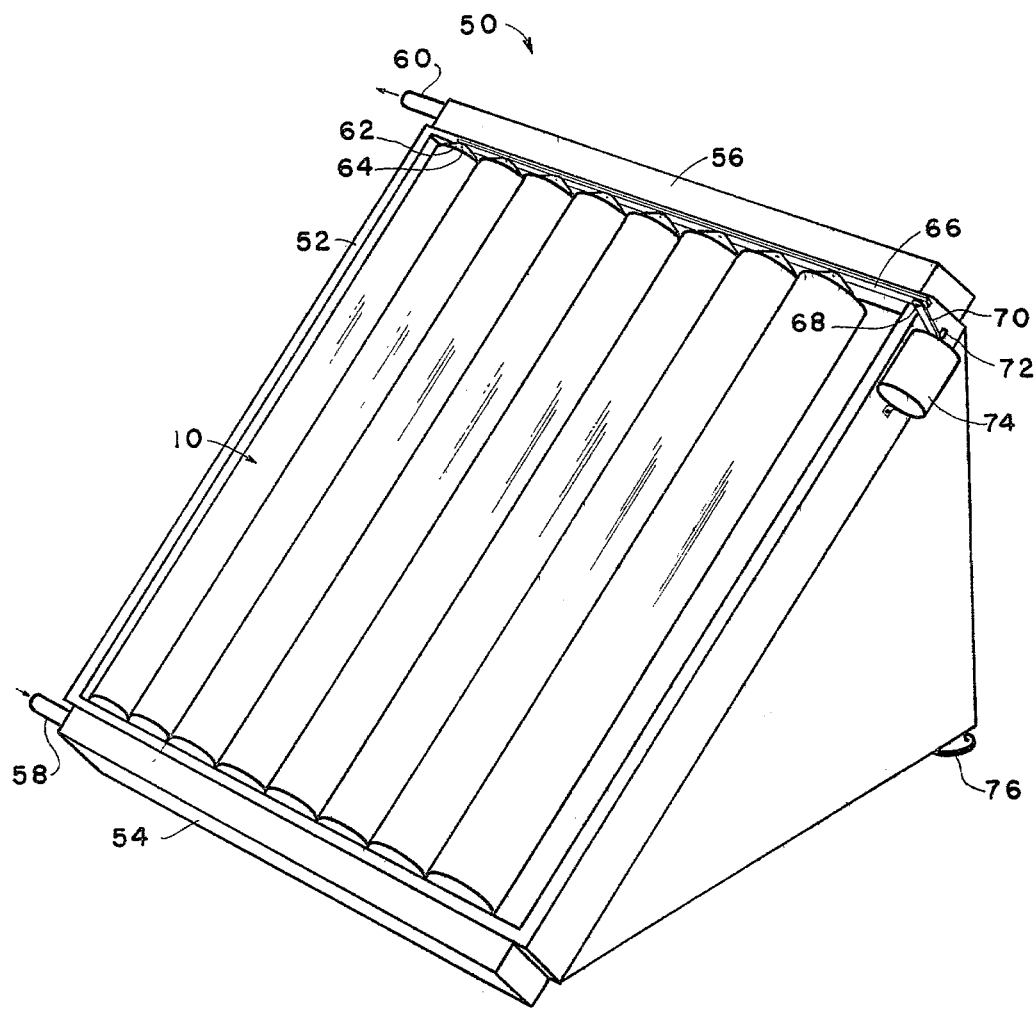
FIG. 3 is a perspective detail of an array of units.

FIG. 1 shows the configuration of a preferred-embodiment unit 10, which has the following parts.

First end 20 and second end 22 are disk shaped and parallel spaced. Between them they support in co-axial spacing three cylindrically tubular elements.

The outer tubular element is first insulator 24, which may be made of glass or transparent plastic. The intermediate tubular element is second insulator 26 and of similar material; both these elements terminate at the disk-shaped ends.

The inner tubular element is conductor 28, the first and second ends 30, 32 of which protrude through respective holes (34 shown) in the ends and serve as part of the means for mounting the unit for use, as will be described.

The conductor 28 may be of thermally highly conductive metal such as aluminum and has along the central part of the length a series of parallel-spaced thin plate-like radially disposed flanges 36, which preferably are of the same material as the conductor, and preferably are integrally affixed to it. Conductor and flanges are preferably painted black or otherwise blackened.

For more economical procurement the conductor and flanges may be purchased as a unit of the type used in hot-water air-heating heat exchangers.

As solar energy gathering and concentrating means, a sheet of reflective material 38 such as aluminum foil coated paper or aluminized "MYLAR" sheet to name two commercially available materials, is laid on the interior surface of the first insulator, reflective side up, so that in curvature it conforms to that inner surface and comprises an upwardly cylindrical reflective trough extending around perhaps 150° to 180° of the curve of that inner surface.

This reflective material may be freely positionable in the first insulator through a limited angle of circumferential travel for initial adjustment, and may be shifted manually to some degree to follow the sun when the axis of the unit is fixed generally perpendicular to the direction of the sun.

Alternatively the reflective material may be cemented or otherwise affixed to the inner surface of the first insulator.

The underside of the reflective material is preferably painted black for greater efficiency.

FIG. 2 shows a sectional detail of how the end pieces unite the unit in assembly. Each end (22 shown) has a turned groove or smaller diameter 40, sized for press fit with the inside diameter of the first insulator 24, which abuts circumferential shoulder 42 on the end.

Second insulator 26 similarly fits in a groove 44 turned in the inner face and makes a press fit with it on assembly.

Conductor 28 passes through a central clearance hole 46 in the end, which hole has an "O" ring 47 protrusive into it from a radial groove 49 intermediate the length of the hole; fit is such that the "O" ring seals against the conductor.

Reflective sheet 38 may rest against the end to prevent shifting axially when moved.

A thrust ring 48 of any conventional design may be used to prevent shifting of the other elements relative to the ends. The assembly may be cemented together if desired, but need not, as the structural fit by itself gives good support with ready disassembly. The assembly requires merely putting the tubular elements coaxial with each other and slipping in the reflector, then snapping on the ends, all very quickly done and without any particular training or skill required.

FIG. 3 shows a plurality of units 10 mounted as an in-plane array 50 in a frame 52 for co-acting collection of solar energy.

The bottom and top of the frame may have insulative covers 54, 56. Input 58 of fluid to be heated is preferably at the bottom and output 60 at the top. The input and output connect with any suitable heat exchanger in a room or reservoir space to be heated.

The conductors serve as the respective axes of rotation and fixed to each unit at an end preferably is a radially protrusive tab 62, all of which tabs have pivotal attachments 64 to a bar 66, which in turn has pivotal attachment 68 to an arm 70 on a motor shaft 72 conventionally turned by a heliostat or other suitable motor means 74 on the frame at a rate causing the reflectors to follow the sun and reflect and concentrate radiant energy through the inner insulator onto the conductor. The flanges produce an area enhancement effect which enlarges the conductive receiving area and more efficiently heats the fluid at very little increase in cost. The need for a parabolic reflector is relieved by the design.

Frame 52 includes conventional means for latitudinal and seasonal adjustment such as screw-legs 76 at the rear corners, or other suitable means comprising, in association with the frame, pedestal members for adjusting height of one end of the units relative to the other.

Fluid used in the system may be any conventional gas or liquid such as air, water, or water and anti-freeze. A pump may be used for circulation or natural convection may be used.

Figure 4:
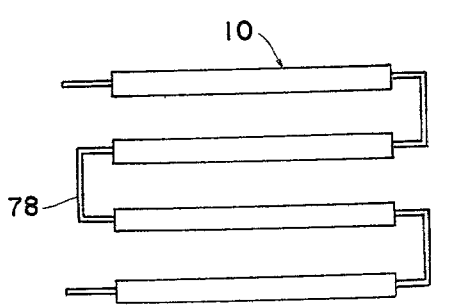
FIG. 4 is a plan-diagrammatic representation of a first or series hookup of units.

FIG. 4 shows that connective tubing 78, which may be rubber or plastic or other conventional material, stretched over the conductors or otherwise tightly connected, may hook up the system so that the units 10 are all in series.

Figure 5:
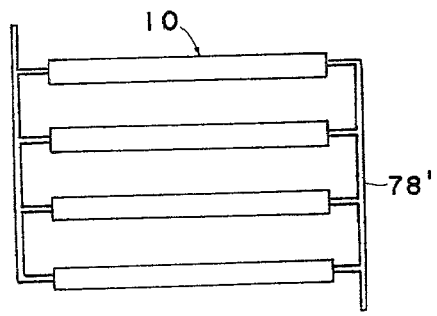
FIG. 5 is a plan-diagrammatic representation of a second or parallel hookup of the units.

FIG. 5 shows that the units may as easily be connected in parallel by appropriate disposition of the tubing 78'. It will be appreciated that the units may also be connected in series-parallel, if desired.

Typical sizes of selected components may be:
length of the insulators: 5 feet (1.5 m);
diameter of 1st insulator: 4½ inches (11.5 cm);
diameter of 2d insulator: 3½ inches (9 cm);
diameter of conductor: ¾ inch to ⅞ inch (18 mm to 24 mm);
size of flanges: ¾ inch by 4 inches (18 mm by 10 cm);
thickness of ends: 1 inch (2.5 cm);
wall thickness of plastic tubing: ⅛ inch (3 mm)

Typical weight of a unit is 10 pounds (4.5 kg.) empty.

In conclusion it will be seen from the above that the insulative efficiency of the described coaxial double wall structure is very high; that the individual elements, or subgroups only, can be connected to follow the sun, if desired, as for partial shut down of capacity or for cleaning; that assembly is practically foolproof, even in the field, without need for expensive jigs or other such tools, and in fact can be done entirely without tools; that the unit is self-protective and can easily be shipped compactly in a close fitting carton; that all parts are readily available, including the interconnections which may be simple plastic plumbing fittings; that material cost is low; that the design is ideal for mass production, the end caps being the only special parts and these being readily produced by turning or by molding. The reflective material, as an option, may be cemented on the outside of the first insulator.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a system for collection of solar energy, including a first insulator in the form of a first tube which is transparent, a fluid conductor housed coaxially within the first tube, end closing means and support means for the system, and means for reflecting sunlight along the fluid conductor, the improvement comprising in assembly: a second insulator in the form of a second tube coaxially spaced between the first tube and the fluid conductor, the conductor having first and second ends extending through the end closing means beyond the respective first and second tubes, the end closing means sealing around the conductor first and second ends, the means for reflecting being within the first tube, the first and second tubes and the fluid conductor being cylindrical, the means for reflecting being a reflective sheet with a black underside conforming to the contour of the first tube, the reflective sheet movable relative to the first tube and having an edge resting against said end closing means for preventing movement; a series of radial flanges extending from the fluid conductor, the radial flanges being of rectangular shape heat conductive material integral with the fluid conductor, said flanges being black, said end closing means having respective grooves therein receiving the respective ends of the first and second insulators and an "O" ring seal in a central opening therein sealing around said conductor first and second ends, the support means including said extension of the first and second ends of the conductor having association with respective portions of said supporting means including first and second pedestal members, one of said pedestal members having proportion for holding one of said first and second ends of the conductor higher than the other; means for orienting the reflecting means and said first and second tubes for receiving sunlight continuously throughout a day; and further, a plurality of said assemblies with said orienting means connecting all said assemblies for orienting together all said reflecting means.

* * * * *